Feb. 9, 1932.                C. B. FALKENSTEIN                1,844,351
                              INSERT FOR SAND MOLDS
                              Filed June 14, 1930
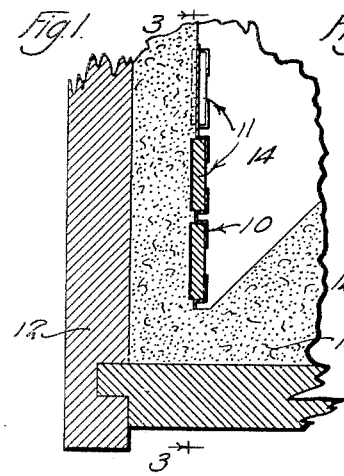
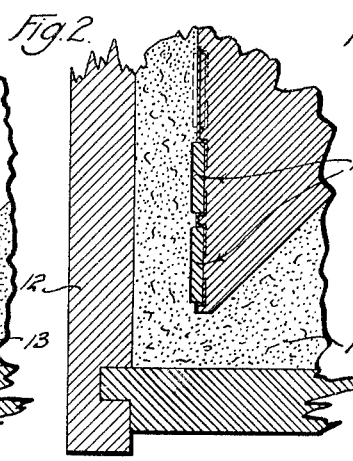
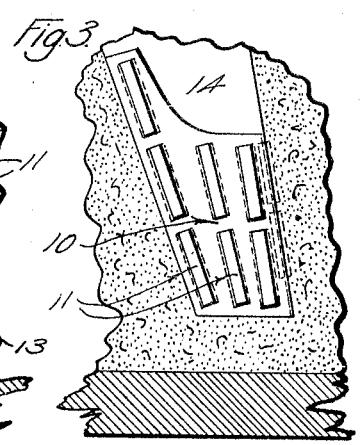
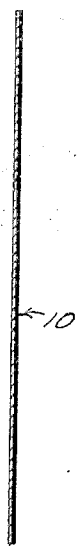
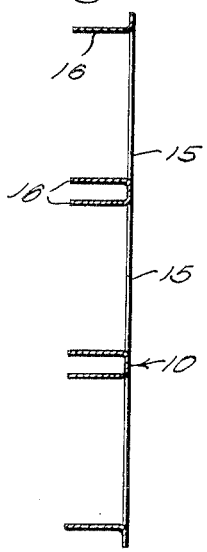
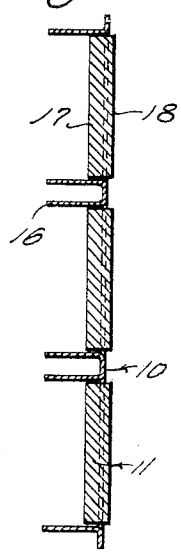
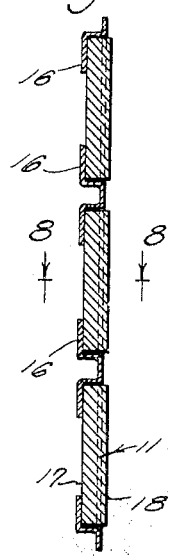
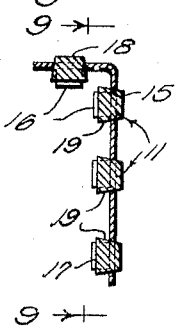
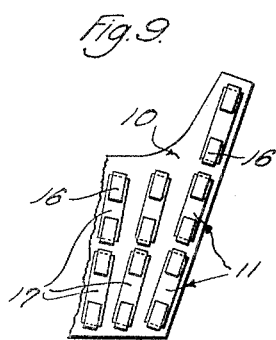
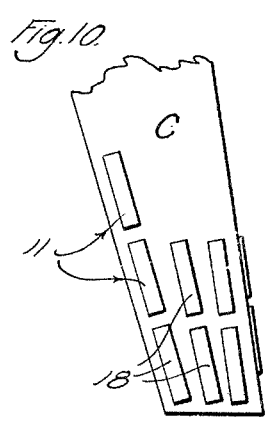
Inventor
COBURN B. FALKENSTEIN
by
his Attorney Patented Feb. 9, 1932

1,844,351

UNITED STATES PATENT OFFICE

COBURN B. FALKENSTEIN, OF SAN BERNARDINO, CALIFORNIA, ASSIGNOR TO GLOBE OIL TOOLS CO., OF LOS NIETOS, CALIFORNIA, A CORPORATION OF CALIFORNIA

INSERT FOR SAND MOLDS

Application filed June 14, 1930. Serial No. 461,206.

This invention relates to a cutting device or cutter and relates more particularly to a cutter assembly embodying small particles or pieces of hard cutting material embedded or molded in the body of the cutter.

It is a general object of this invention to provide a simple, practical, and improved means for assembling or embodying a plurality of bodies of hard cutting material in a cutting tool.

Small pieces or bodies of hard cutting material such as tungsten carbides, and the like, are used in tools of various characters and are usually embedded or mounted in the cutting parts or edges of the tool. The bodies of hard cutting material referred to are usually comparatively small and it has been the common practice to weld them onto the cutting surfaces and edges of the tools. The welding of the bodies of hard cutting material onto a tool is more or less injurious to the body and the surface of the tool and to the hard cutting material. Further, with the usual welding methods it is necessary to handle and weld each of the small bodies of material individually.

It is an object of this invention to provide an assembly of a plurality of bodies of hard cutting material for application to a mold for embodying or embedding the bodies in a tool as it is cast or formed.

It is another object of the invention to provide an improved structure for supporting a plurality of bodies of hard cutting material in a mold that effectively retains the bodies in their proper positions during the casting or forming of a tool.

It is another object of the invention to provide a supporting structure or carrier for a plurality of bodies of hard cutting material that is melted so that it mingles with the molten metal forming the tool when the tool is cast so that the bodies of hard material are embedded or set in a uniform mass of metal.

It is a further object of this invention to provide an assembly of a plurality of bodies of hard cutting material and a carrier for the bodies that are formed so that the molten metal forming the tool directly contacts with the bodies of hard material and encases substantial portions of the bodies.

A further object of the invention is to provide a body of hard cutting material that is shaped and carried in a mold so that it is effectively locked or set in the metal forming the tool when the tool is cast.

Other objects and features of my invention will be best and more fully understood from the following detailed description of a typical form and application of the invention, throughout which description reference is had to the accompanying drawings, in which:

Fig. 1 is a vertical detailed sectional view through a typical mold illustrating the assembly provided by the present invention arranged against the wall of the matrix or cavity of the mold. Fig. 2 is a view similar to Fig. 1 illustrating the cavity of the mold filled with the metal to form the tool. Fig. 3 is a vertical detailed sectional view taken substantially as indicated by line 3—3 on Fig. 1. Fig. 4 is a longitudinal sectional view of a plate from which the carrier may be formed. Fig. 5 is a vertical detailed sectional view illustrating the manner of cutting and forming the carrier for receiving the bodies of hard cutting material. Fig. 6 is a view similar to Fig. 5 showing the bodies of material in position on the carrier. Fig. 7 is a view similar to Fig. 6 illustrating the bodies of hard cutting material locked in the carrier. Fig. 8 is a transverse detailed sectional view taken as indicated by line 8—8 on Fig. 7. Fig. 9 is a reduced rear view of the assembly, being a view taken substantially as indicated by line 9—9 on Fig. 8. Fig. 10 is a side elevation of a portion of the tool showing the bodies of hard material projecting from its sides.

The invention is intended primarily for use in connection with tools or cutters of various characters embodying inserts or bodies of hard cutting material. As a typical application of the invention, I will refer to well bits or drills as tools having cutting edges or parts that can be advantageously set with bodies of hard cutting material. Throughout the following detailed description I will describe the invention as used in connection with the casting or forming of a cutter for a well bit.

The present invention includes, generally, a supporting structure or carrier 10 adapted to be arranged in the cavity 14 of a mold and one or more bodies 11 of hard cutting material carried by the carrier 10.

The supporting means or carrier 10 is provided to carry the bodies 11 of hard cutting material and is adapted to be arranged in a matrix or mold in which the tool is to be cast. In accordance with the broader principles of the invention the carrier 10 is adapted to be formed for arrangement in molds of various characters. In the drawings I have illustrated a typical mold 12 filled with molding sand 13 in which a cavity 14 has been formed for receiving the molten metal to form the tool. The carrier 10 may be formed to be arranged against any particular portion or portions of the walls of the cavity 14. The carrier 10 is preferably formed of a comparatively thin plate of metal and may be proportioned to cover an entire wall of the cavity 14 or to cover any portion or portions of the walls of the cavity 14 as desired. In accordance with the invention the carrier 10 is formed of a metal having a low melting point. For example, it may be formed of soft iron. The carrier 10 being formed of soft metal is readily bent or formed to fit against the walls of a mold cavity. In the particular case illustrated the carrier 10 is shaped to cover or fit against one side wall and one end wall of the cavity 14. The carrier 10 may be designed to carry any number of bodies 11 of hard cutting material and may be constructed to support the bodies 11 in the mold in any desired arrangement or positions.

In the particular case illustrated the carrier 10 is constructed to carry a plurality of bodies 11 in spaced longitudinal rows. An opening 15 is provided in the carrier 10 for receiving or carrying each body 11 of hard material. The openings 15 are shaped to effectively receive or carry the bodies 11, and in the form of the invention illustrated in the drawings are elongated rectangular openings to receive the bodies 11 which are illustrated as being rectangular in their general configuration. The openings 15 may be formed in the carrier 10 by making longitudinal parallel cuts in the carrier and bending the portions or parts 16 between the cuts outwardly at the opposite ends of the cuts. The parts 16 are initially bent to project from what I will term the inner side of the carrier 10 and are employed to aid in retaining the bodies 11 in the openings 15, as will be hereinafter described.

The bodies 11 are formed of hard cutting material such as tungsten carbide, and the like, and are provided to give the cutting tool an edge or face of hard abrasive and wear resisting qualtities. The outer sides of the bodies 11, which are to project from the tool when formed, may be shaped as desired. The bodies 11 of hard cutting material are shaped to seat in the openings 15 of the carrier 10. In the particular case illustrated in the drawings the bodies 11 are substantially rectangular having substantially flat parallel inner sides 17 and outer sides 18. The edges 19 of the bodies 11 are outwardly convergent or beveled outwardly toward the sides 18. The bodies 11 are proportioned and related to the openings 15 so that when they are arranged in the openings 15 their beveled edges 19 engage the walls of the openings 15 to hold them against outward movement in the openings. The bodies 15 may be proportioned so that they project the desired distance outwardly from the outer side of the carrier 10. The edges 19 are uniformly beveled so that the outer sides 19 of the bodies 11 are substantially parallel with the outer side of the carrier 10. The inwardly projecting parts 16 of the carrier 10 are employed to retain the bodies 11 in the openings 15. When the bodies 11 have been arranged in the openings in the carrier the parts 16 are bent inwardly against the inner sides 17 of the bodies 11. The parts 16 are bent so that they engage the opposite ends of the bodies as well as the inner sides 17 of the bodies. The parts 16 may be cut or shortened after the openings 15 have been formed so that there is a substantial distance between the ends of the parts 16 when they are bent to the holding or retaining positions. The beveled edges 19 of the bodies 10 hold the bodies against outward displacement from the openings 15, while the bent parts 16 hold the bodies against longitudinal and inward displacement.

In employing the invention the carrier 10 is arranged in the cavity 14 of the mold against the wall or walls of the cavity so that the bodies of hard cutting material 11 will be positioned as desired in the finished casting. In the particular case illustrated the carrier 10 is shaped to fit against the lower portion of one side wall and one end wall of the cavity 14 so that the bodies 11 will project from the forward side and outer edge of the cutter C. The carrier 10 is arranged in the cavity 14 so that the outwardly projecting portions of the bodies 11 are embedded in the sand 13 of the mold. When the metal is poured into the cavity 14 to form the tool or cutter the carrier 14 is melted so that the material forming the carrier is mixed with the metal forming the tool. The molten metal accordingly directly engages the inner sides 17 and the edges 19 of the bodies 11 so that the bodies 11 are directly embedded in the metal forming the tool. The convergent edges 19 of the bodies 11 lock or set the bodies in the material forming the tool so that they are positively held against displacement from the tool. The carrier 10 acts to hold the bodies 11 in the desired position during the filling of the cavity 10 and until the molten metal filling the cavity prevents displacement of the bodies 11.

It will be apparent that the present invention provides a simple means for mounting bodies of hard cutting material in a mold so that they will be in the desired positions when the tool is cast. The carrier 10 is such that it does not interfere with the proper binding or engagement of the material forming the tool with the bodies. The carrier 10 is simple and inexpensive of manufacture and the bodies 11 may be quickly and easily arranged in position in the carrier.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. An insert for a sand mold including, a carrier having a plurality of openings, and bodies of hard cutting material in the openings and projecting from opposite sides of the carrier, the bodies having convergent edges, the carrier being shaped to lie flat against a wall of a mold cavity throughout its extent.

2. An insert for a sand mold including, a carrier having a plurality of openings, the carrier being shaped to lie flat against a wall of the mold cavity, bodies of hard cutting material in the openings and projecting from opposite sides of the carrier, and projecting parts on the carrier at each opening for engaging the bodies to hold them against inward displacement from the openings, the bodies having beveled edges engaging the walls of the openings to hold the bodies against outward displacement from the openings.

3. An insert for a mold including, a carrier formed of a plate, soft metal having a plurality of spaced openings, the carrier being shaped to lie flat against a wall of the mold cavity, bodies of hard cutting material in the openings and projecting from the carrier, and projecting parts at the ends of the openings bendable to engage the ends and inner sides of the said bodies to hold the bodies against inward displacement from the openings, the edges of the bodies being beveled to engage the walls of the openings to hold the bodies against outward displacement from the openings.

4. An insert for a mold including, a carrier shaped to lie flat against a wall of the mold, there being spaced openings in the carrier, bodies of hard cutting material in the openings projecting from opposite sides of the carrier, and inwardly-projecting parts on the carrier at each opening for engaging the inner side of a body of cutting material to hold it against inward displacement.

In witness that I claim the foregoing I have hereunto subscribed my name this 13th day of May, 1930.

COBURN B. FALKENSTEIN.